Dec. 9, 1969  M. J. BEBECH  3,482,700

MULTIPLE FILTER ELEMENT CLEANING MEANS

Filed June 17, 1968  3 Sheets-Sheet 1

INVENTOR.
MICHAEL J. BEBECH
BY
*Oldham & Oldham*
ATTORNEYS.

Dec. 9, 1969  M. J. BEBECH  3,482,700

MULTIPLE FILTER ELEMENT CLEANING MEANS

Filed June 17, 1968  3 Sheets-Sheet 2

INVENTOR.
MICHAEL J. BEBECH
BY
*Oldham & Oldham*
ATTORNEYS.

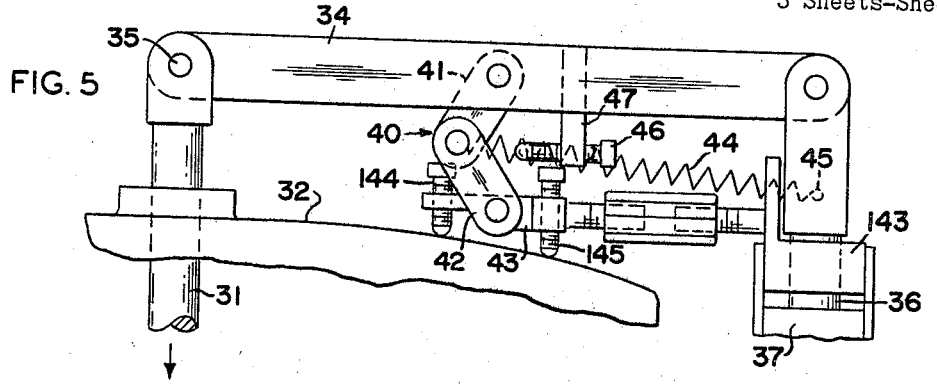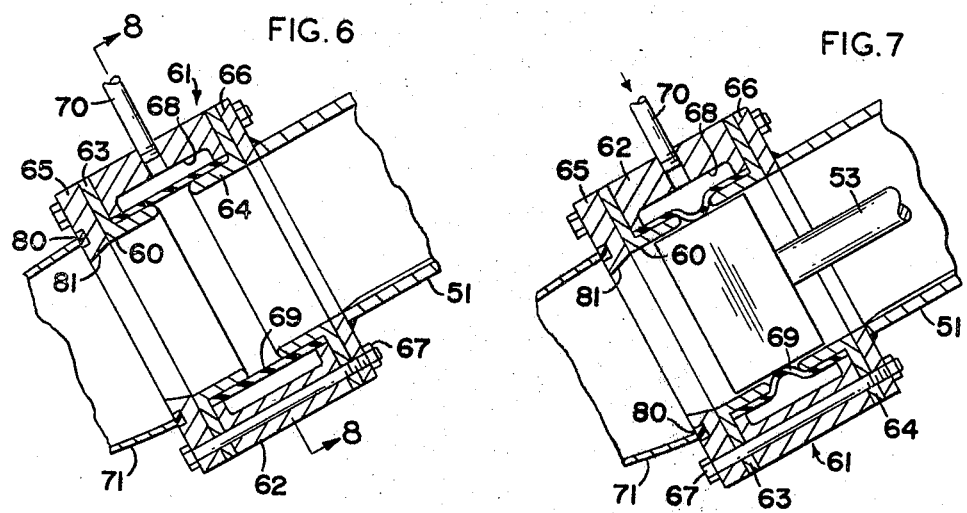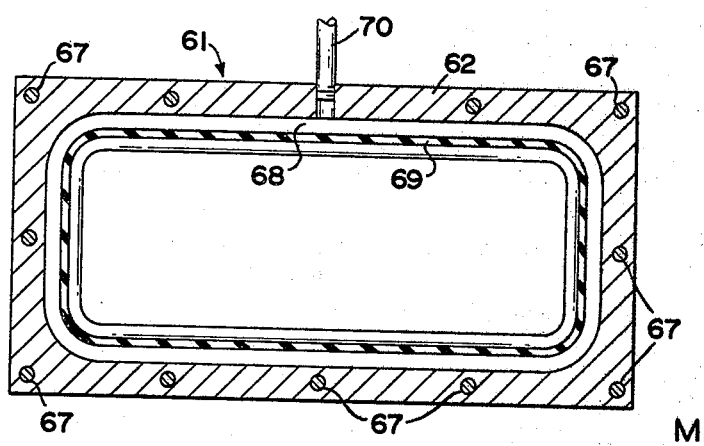

United States Patent Office 3,482,700
Patented Dec. 9, 1969

3,482,700
MULTIPLE FILTER ELEMENT CLEANING MEANS
Michael J. Bebech, R.D. 1, Box 73,
Masury, Ohio 44438
Filed June 17, 1968, Ser. No. 737,587
Int. Cl. B01d 35/22
U.S. Cl. 210—332                           10 Claims

ABSTRACT OF THE DISCLOSURE

In this apparatus, a novel diaphragm means is provided in a receptable to divide it into upper and lower chambers. The diaphragm means include a center support plate having filter members depending therefrom, and a flexible peripheral sheet member connects to the center support plate and is in sealed engagement with such center plate and the receptacle means. Other members are present to lift and drop the center support means to knock filtered solids from the tubular filter members for deposit in the bottom of the apparatus.

---

The present invention relates to liquid filter apparatus and such apparatus comprises an improvement upon the apparatus shown in and covered by my previous U.S. Letters Patent No. 3,115,458. While apparatus conforming to said patent has been made and used successfully for some time, my new apparatus presents an improved means avoiding the use of a movably positioned sealed container as provided in my prior structure for receiving filtered liquids.

The general object of the present invention is to provide an improved apparatus for filtering liquids and which apparatus includes a diaphragm means extending across a liquid receptacle means to divide it into upper and lower chambers and which diaphragm means includes a flexible sheet movably positioning the diaphragm means in the receptacle.

Another object of the invention is to proivde an improved flexible assembly in a filtering apparatus which flexible assembly supports a plurality of filter members thereon and with the diaphragm means being movably positioned in the apparatus to be raised and lowered or dropped therein to aid in shaking or separating filtered solids from the filter apparatus.

Another object oft he invention is to provide an improved discharge means in filter apparatus for collecting the filtered solids and for forcibly expelling them from the apparatus when desired.

Another object of the invention is to provide an improved seal chamber in association with a discharge opening provided in the filter receptacle and which seal means can be brought into sealed engagement with a ram or other discharge member when it is desired to open the discharge portion of the apparatus or to remove filtered solids theroform in any suitable collector means associated with the discharge opening.

The foregoing and other objects and advantages of the invention will be made more apparent as the specification proceeds.

Attention now is particularly directed to the accompanying drawings wherein:

FIG. 5 is an elevational view similar to FIGS. 3 and 4 but showing the apparatus when the diaphragm means has been dropped to its lowermost position;

FIG. 6 is a fragmentary enlarged longitudinal section through the discharge opening and associated seal means of the apparatus;

FIG. 7 is a fragmentary longitudinal enlarged section, like FIG. 6, but showing such means in its sealed or operative position; and FIG. 8 is a section taken on line 8—8 of FIG. 6.

When referring to corresponding members shown in the drawings and referred to in the specification, corresponding numerals are used to refer to corresponding parts to facilitate comparison therebetween.

Figure 1:
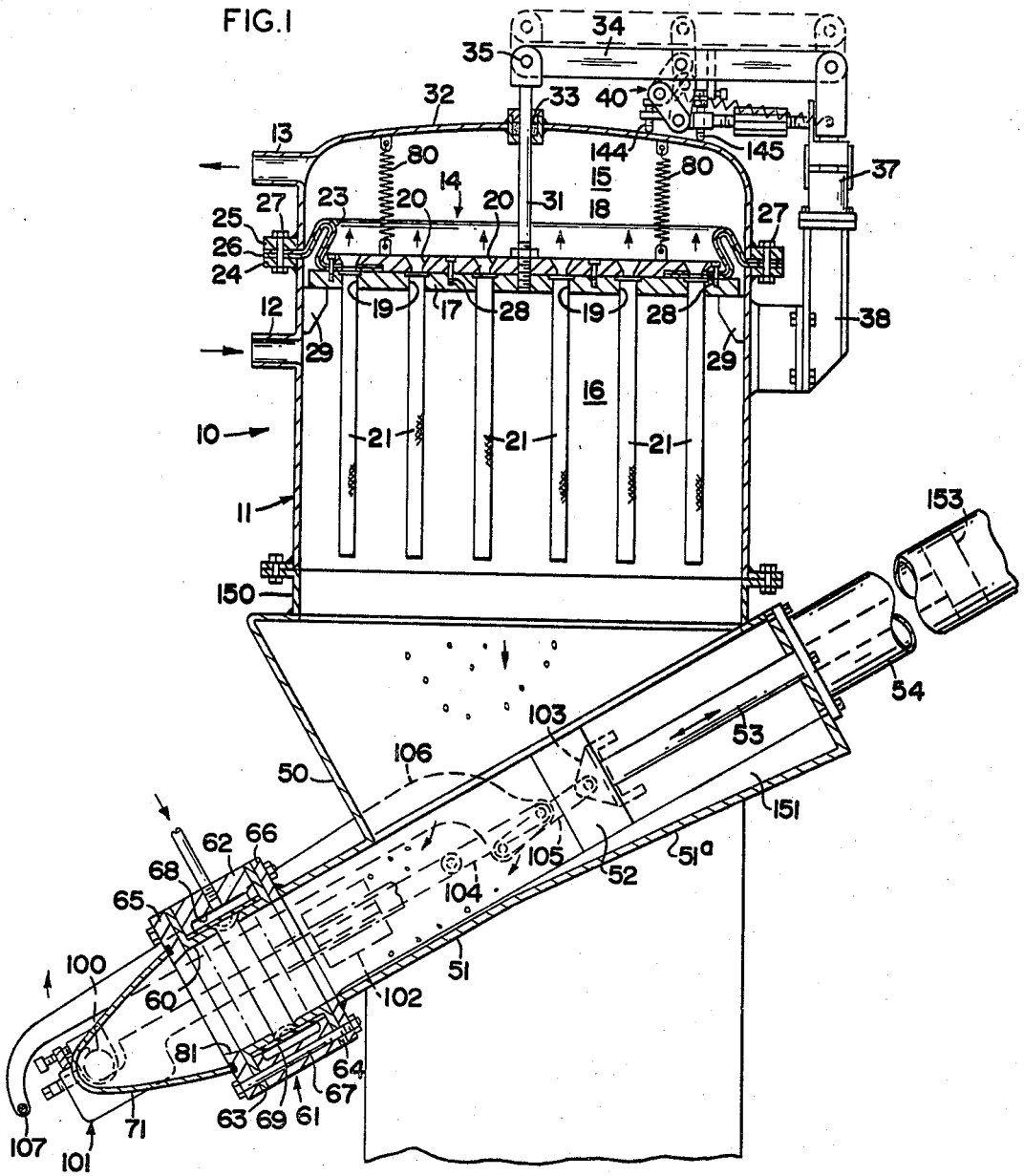
FIG. 1 is a vertical section of a liquid filter apparatus embodying the principles of the invention.

Reference is now made to the details of the structure shown in the accompanying drawings, and a liquid filter apparatus of the invention is indicated as a whole by the numeral 10. This apparatus 10 includes a receptacle means such as a tank 11 which is of any suitable construction, and usually provides a closed chamber therein with such receptacle, tank, or receptacle means 11 having an inlet 12 connected to a lower portion of the receptacle 11 and an outlet 13 connecting to an upper portion of the receptacle.

A diaphragm means indicated as a whole by the numeral 14 is movably secured to the receptacle 11 and extends thereacross to divide it into an upper chamber 15 and a lower chamber 16. The inlet 12 connects to any suitable source of liquid material which is to be filtered in the apparatus 10. Liquid to be filtered can be supplied in any desired form and it is supplied under any conventional but constant pressure and with the liquid normally filling the receptacle and flowing upwardly therein for discharge in filtered condition through the outlet 13.

Figure 2:
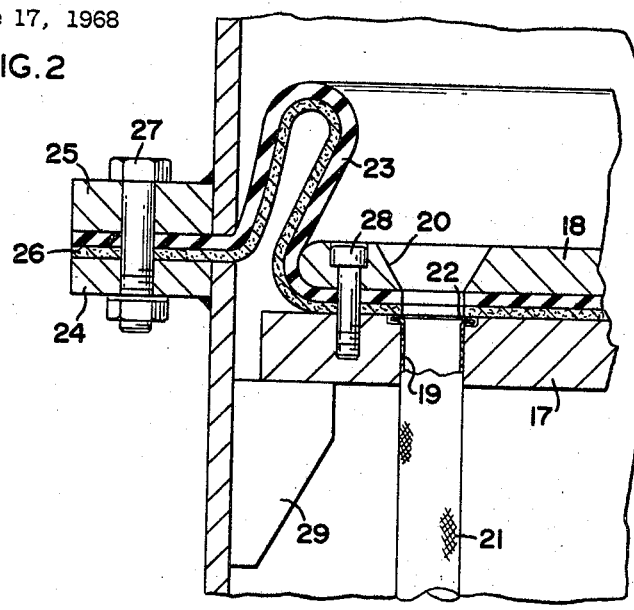
FIG. 2 is an enlarged fragmentary vertical section of a peripheral portion of the diaphragm means and associated members in the apparatus.

FIG. 2 of the drawings best shows that the diaphragm means 14 comprises a center support means such as a pair of plates 17 and 18 usually made from metal with each of such plates having a plurality of apertures 19 formed in the plate 17 and, usually, a plurality of apertures 20 with upwardly diverging walls provided in the plate 18 and such apertures 19 and 20 are aligned in the plates as operatively positioned. A plurality of hollow filter members, preferably comprising tubular screens 21, are secured to the plate 17 and they may be secured to the plate 17 in any desired manner, as by outwardly flaring ends 22 of the tubular screens into engagement with portions of the plate 17 around the apertures 19. To aid in movably positioning the plates 17 and 18, a flexible peripheral sheet 23 is suitably secured to the receptacle 11 as by engaging its peripheral edge by or between a pair of gasket rings 24 and 25 that usually have a separate gasket 26, as well as the edge of the sheet 23, received therebetween and with the rings 24 and 25 being brought into snug engagement for sealed connection with the sheet by conventional members, such as bolts 27. The sheet 23 is compressed between the plates 17 and 18 and is sealed therebetween by a number of cap screws 28 that secure the plates 17 and 18 together and which aid in positioning the tubular screens 21 on the plate 17 to extend downwardly therefrom. The sheet 23 can be made from any suitable flexible material, such as fabrics and/or sheets of nylon, synthetic rubbers and elastomers and equivalent materials, and such sheet 23 is positioned in the apparatus so that when the diaphragm means 14 is in its relaxed or released position, the sheet 23 has an upwardly or downwardly extending fold, loop or bulge therein. This excess material in the diaphragm means permits the center support means to be moved in the receptacle to vary the size of the upper chamber. Any desired type of support members or means, such as a plurality of brackets 29, are secured to the inner surface of the receptacle 11 and extend inwardly thereof to engage the lower plate 17 and support the diaphragm means 14 when in its released or lowermost position in the apparatus.

Figure 3:
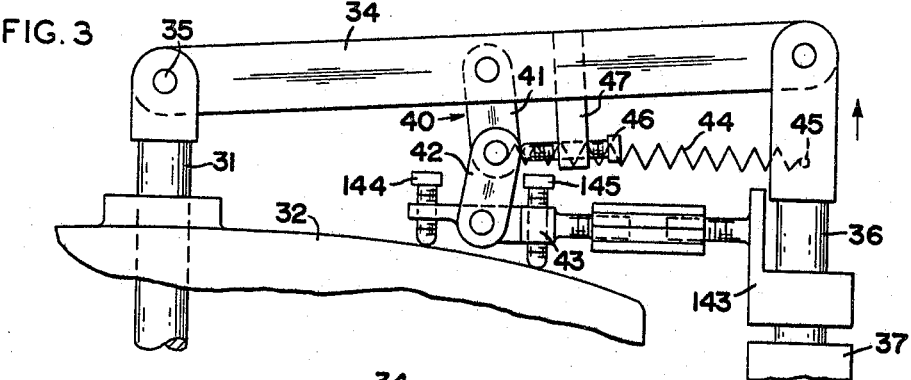
FIG. 3 is a fragmentary elevation of the diaphragm moving means and controls therefor of the apparatus showing it in its uppermost position.
Figure 4:
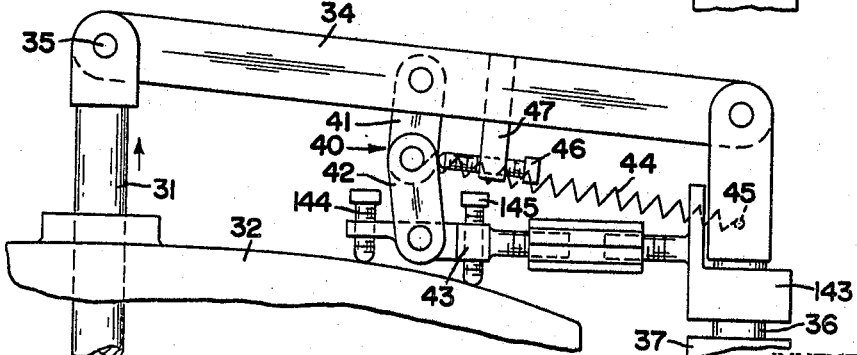
FIG. 4 is an elevation like FIG. 3 but showing the action of the lifting means upon downward movement of the control piston.

As indicated in the drawings, the apparatus of the invention is adapted to raise the diaphragm means 14 in the apparatus and to drop such diaphragm means down so that it sharply strikes the brackets 29 to aid in knocking or discharging the filtered solid materials collecting on the tubular screens 21 therefrom so that such solids settle to the bottom of the receptacle 11. The movement in the diaphragm means 14 is provided by means of a control rod 31 which engages the plates 17 and 18 and extends upwardly of the receptacle and out through the top 32 of the receptacle. Any suitable packing means 33 is in association with the control rod 31 for sealed but slidable engagement with the control rod. A control lever 34 pivotally engages the upper end of the control rod 31 by a pin 35 or similar member and movement of the control lever 34 is partially controlled by a rod 36 extending from any suitable manual or power control means such as a cylinder 37. The cylinder 37 is suitably carried by the receptacle 11 or is in fixed association therewith, as by being secured to a bracket 38 on the outer surface of the receptacle 11. Control means (not shown) are connected to the cylinder 37 to make it a double acting cylinder so that as the piston rod 37 moves upwardly, it raises one end of the control lever 34, and, at the end of its upward movement, a toggle means indicated by the number 40, FIG. 3, is moved into extended, or cocked position by the upward movement of one end of the control lever 34. Such toggle means is shown to comprise a pair of toggle links 41 and 42 pivotally connected between about a center portion of the control lever 34 and an arm 43, suitably held in a fixed position as by an adjustable bracket 143 that slidably engages the piston rod 36. The arm 43 carries a pair of set screws 144 and 145 that extend downwardly therefrom in an adjustable manner to bear on the top 32 and aid in positioning the arm 43 and associated means. A coil spring 44 connects between a pin or lug 45 on the control lever and the mid point of the toggle links 41 and 42 to urge it to an operative or cocked position as shown in FIG. 3, when the piston rod is extended. With the toggle means 40 as shown in FIG. 3, then downward movement of the piston rod 36 raises the control rod, diaphragm means and members associated therewith. FIG. 3 shows that the toggle links 41 and 42 are moved but a few degrees over a dead center position by the coil spring 44 as the toggle link 41 contacts an adjustably positioned stop 46 extending from a lug or finger 47 depending from the control lever 34. This stop 46 is positioned closely to the toggle link 41 so that when the piston rod 36 has moved downwardly a major portion of its movement, the angular relationship between the toggle link 41 and stop 46 is changed as the stop moves the toggle means 40 a few degrees toward the control rod 31 and this will cause the toggle means to collapse, as indicated in FIG. 5. The control rod 31, diaphragm means and associated members will then drop downwardly of the receptacle means, aided by the weight of liquid carried by the diaphragm means 14, to cause the plate 17 to drop onto the stops or support brackets 29 and give an impact to the plates 17 and 18 and tubular screens 21 to knock or shake the filtered solid materials collecting on the tubular screens 21 therefrom. Such solids will then, being heavier than the filtered liquid, sink to the bottom of the receptacle 11 for discharge therefrom. Compression springs 80 are positioned between the top 32 and the plate 18 to aid in downward movement of the plate, and are secured in position in any suitable manner.

A bottom 50 is provided as a part of the receptacle 11 and such bottom has a portion that is downwardly inclined towards a side portion of the receptacle 11 and the bottom has a substantially rectangularly contoured center section or collecting section 51 therein. Usually the receptacle 11 is of cylindrical shape and the bottom 50 of rectangular shape is as wide as the receptacle and connects thereto by a section 150. A ram or piston 52 is positioned in this collecting section 51 and it is perpendicular to the longitudinal axis thereof. The ram 52 has a piston rod 53 connecting thereto and extending out through a portion of the receptacle 11 to connect to a control piston 153 provided in a power cylinder 54 suitably positioned immediately adjacent the receptacle 11. The power cylinder or any other suitable control means 54 provides drive to the ram 52 for controlling its position in the receptacle and to provide longitudinal movement of the ram along the collecting section 51 when the cylinder 54 is energized for filtered material discharge action.

A discharge opening 60 is provided in the receptacle 11 at one margin thereof where the collecting section 51 protrudes from a marginal portion of the receptacle bottom. This discharge opening 60 is, as shown in FIG. 8, preferably of substantially rectangular shape in cross section but it may be of other contours. This discharge opening 60 is shown as formed by a sub-frame assembly 61 that includes an edge frame 62, a pair of rings 63 and 64, one of which is of substantially L-shape and the other one of which is of substantially reversed L-shape in section, and a pair of end plates 65 and 66. Or, the rings 63 and 64 may comprise just the radially inner, annular portions thereof shown that would be welded to the associated end plates 65 and 66, respectively. The entire sub-frame assembly 61 is then secured together by longitudinally extending bolts 67, or equivalent, and is attached to the receptacle 1, as by welding the end plate 66 to the section 51 of the bottom 50, as indicated in FIG. 6. The edge frame 62 has a radially inwardly open chamber 68 formed on the radially inner surface thereof, and a resilient annular sealing band 69 has marginal portions secured in sealed engagement with the edge frame 62 to position it at the radially inner margin of the chamber 68. Suitable gaskets (not shown) may be provided between the edge frame 62 and rings 63 and 64 and/or end plates 65 and 66, as required. Thus, any desired pressure liquid can be supplied to the chamber 68 through a conduit 70 carried by the edge frame 62 and connecting to the chamber 68 and to any suitable source of pressure liquid (not shown). Hence, when the cylinder 54 is energized to move the ram 52 for discharge action and such ram has been moved to a marginal portion of the collecting section 51, then fluid can be supplied through the tube 70 to cause the annular band 69 to be moved radially inwardly for good sealing engagement with the periphery of the ram 52. At that time, any desired type of a discharge container 71 which is attached to the end plate 65 in any desired releasable manner, can be released from the receptacle 11 and any filtered solids discharged thereinto can be dumped. Thereafter, the discharge receptacle 71 is reapplied and the ram 52 moved back to its inoperative position. The container 71 abuts on a gasket 80 carried by the end plate 65. Note that the discharge opening in the end plate has converging walls 81 at an acute angle to the axis of the discharge opening 60 to facilitate compacting the filter cake as forced into the container 71. During the discharge stroke of the ram 52, any liquid material in the collecting section 51 or discharge container 71 will gradually be forced to flow therefrom as the ram forces primarily solid material towards such discharge container and such flow will continue until the ram reaches the end of its discharge stroke. During normal operating conditions, suitable pressure is set up within the chamber 68 to maintain the band 69 substantially in the operative sealed position shown in FIG. 6 whereby liquid cannot flow from the receptacle 11 through such seal means.

One suitable release and retainer means for the discharge container is indicated in FIG. 1. The container 71 has a pair of trunnons 100 extending from opposed sides thereof that adjustably engage control arm assemblies 101. Each of the control arm assemblies 101 slidably engages a positioning bracket 102 secured to a portion of the bottom 50. An anchor bracket 103 for each assembly is also secured to the bottom 50, or other fixed member. The inner ends of the control arm assemblies 101 connect to the anchor brackets 103 by links 104 and 105 opposite ends of which are pivotally secured to one of the assemblies 101 and one bracket 103, respectively. Then the linkage is completed by pivotally securing the remaining ends of the links 104 and 105 by overlapped relation to spaced portions of elongate release arms 106 one on each side of the bottom which have portions extending out along the container 71. A cross bar 107 connects the release arms 106 at the front ends thereof. Hence, by pivotal upward movement of the release arms 106, the container 71 is moved from a sealed closed position out to a released movable position for discharge of filtered material received therein.

FIG. 1 shows that a portion of the collecting section 51 flares downwardly at 51a. Usually a pair of guide bars or plates 151 are secured to and extend along the inclined bottom of the collecting section 51. These guide bars 151 support the ram or piston 52 but permit liquid to flow around the ram 52 on its power stroke.

If desired, other types of filter cake or solid material collecting means can be used in association with the apparatus.

By the present construction, a novel and improved fiter apparatus is provided and the objects of the invention have been achieved.

What is claimed is:
1. A liquid filter apparatus comprising
a receptacle means for receiving a liquid to be filtered,
a diaphragm means movably secured to said receptacle means and extending thereacross to divide it into upper and lower chambers,
infeed means connecting to said lower chamber and an outlet connecting to said upper chamber,
said diaphragm means including a center support means, a plurality of hollow filter members secured to said support means and depending therefrom with center bores of said filter members connecting to said upper chamber, and a flexible sheet member in sealed engagement with said center support means and said receptacle means,
a support for said center support means secured to said receptacle means and protruding inwardly of the said lower chamber to limit downward movement of said center support means,
means for lifting said center support means and for dropping it onto said support, and
means for collecting filtered solids at the bottom of said receptacle means.

2. A liquid filter apparatus as in claim 1 where said center support means comprises an apertured metal plate with tubular filter members secured to said plate at each of said apertures at the upper ends of such filter members, and the dropping of said center support means down onto said support knocks filtered solids off of said tubular filter members, said sheet member maintaining a seal between said upper and lower chambers at all times.

3. A liquid filter apparatus as in claim 1 where said peripheral sheet member has a fold therein when said center support means is on said support.

4. A liquid filter apparatus as in claim 1 where said center support means is urged downwardly by spring means operatively connecting between a top portion of said receptacle means and said center support means.

5. A liquid filter apparatus as in claim 1 where
said filter collecting means include a downwardly inclined contoured section in the bottom of said lower chamber,
a driven ram means operatively engaging said contoured section,
means forming a discharge opening connecting to said contoured section,
seal means for engaging said ram means and encompassing said discharge opening, and
collector means removably engaging said discharge opening.

6. A liquid filter apparatus as in claim 1 where a control rod engages said center support means and extends up through the top of said receptacle means, and
said lifting means engage said control rod and comprise a lever arm one end of which pivotally engages said control rod, toggle means engaging and supporting said lever arm intermediate the ends thereof, and a means engaging the other end of said lever arm to raise and lower it to drop said control arm and said center support means.

7. A liquid filter apparatus as in claim 6 where said toggle means are supported on a member that slidably engages said lever arm engaging means.

8. In a liquid filter apparatus including a receptacle means forming a chamber for receiving a liquid to be filtered, and input means connecting to a lower portion of the chamber and an outlet connecting to an upper portion of the chamber, the combination comprising
a diaphragm means movably secured to said receptacle means and extending thereacross to divide it into upper and lower chambers,
said diaphragm means including a rigid center support means, a plurality of hollow filter members secured to said support means and depending therefrom with center bores of said filter members connecting to said upper chamber, and a flexible sheet member in sealed engagement with said center support means and extending therefrom and being sealed to said receptacle means, and
a support for said center support means secured to said receptacle means and protruding inwardly of the said lower chamber to limit downward movement of said center support means.

9. A liquid filter apparatus as in claim 8 where
means are provided for lifting said center support means and for dropping it onto said support, and
means are present for collecting filtered solids at the bottom of said receptacle means,
said filter collecting means including a contoured section at the bottom of said lower chamber connecting to a margin thereof,
a driven ram means operatively engaging said contoured section,
means forming a discharge opening connecting to said contoured section, and
seal means encompassing said discharge opening for engaging said ram means to seal such opening.

10. A liquid filter apparatus as in claim 9 where a converging surface defines said discharge opening.

References Cited

UNITED STATES PATENTS 3,115,458   12/1963   Bebech          210—332 X
3,262,568    7/1966   Zehrbach       210—332 X REUBEN FRIEDMAN, Primary Examiner
F. A. SPEAR, Jr., Assistant Examiner U.S. Cl. X.R.
210—407